(12) United States Patent
Lemberg et al.

(10) Patent No.: US 11,972,118 B2
(45) Date of Patent: Apr. 30, 2024

(54) RESTORE TO FACTORY SETTINGS OF A MOBILE DATA STORAGE DEVICE

(71) Applicant: Western Digital Technologies, Inc., San Jose, CA (US)

(72) Inventors: Alexander Lemberg, Netanya (IL); Rotem Sela, Haifa (IL); Noam Even-Chen, Saad (IL); Asher Druck, Nahariya (IL)

(73) Assignee: Western Digital Technologies, Inc., San Jose, CA (US)

( * ) Notice: Subject to any disclaimer, the term of this patent is extended or adjusted under 35 U.S.C. 154(b) by 8 days.

(21) Appl. No.: 17/853,896

(22) Filed: Jun. 29, 2022

(65) Prior Publication Data

US 2024/0004559 A1    Jan. 4, 2024

(51) Int. Cl.
*G06F 3/00* (2006.01)
*G06F 3/06* (2006.01)
*G06F 12/14* (2006.01)
*G06K 7/14* (2006.01)

(52) U.S. Cl.
CPC .......... *G06F 3/0622* (2013.01); *G06F 3/0632* (2013.01); *G06F 3/0679* (2013.01); *G06F 12/1408* (2013.01); *G06K 7/1417* (2013.01)

(58) Field of Classification Search
CPC .... G06F 3/0622; G06F 3/0632; G06F 3/0679; G06F 12/1408; G06K 7/1417
See application file for complete search history.

(56) References Cited

U.S. PATENT DOCUMENTS

| | | | | |
|---|---|---|---|---|
| 2003/0191979 A1* | 10/2003 | Whitten | ................ | G06F 3/0676 714/6.12 |
| 2013/0167208 A1* | 6/2013 | Shi | ......................... | H04L 63/18 726/5 |
| 2014/0351589 A1* | 11/2014 | Chenna | ............... | H04W 12/068 713/168 |
| 2017/0227965 A1* | 8/2017 | Decenzo | ............... | H04L 67/125 |

\* cited by examiner

*Primary Examiner* — Craig S Goldschmidt
(74) *Attorney, Agent, or Firm* — Patent Law Works LLP

(57) ABSTRACT

A mobile data storage device (DSD) incorporating a mobile data storage device (DSD), the mobile DSD comprising a non-volatile storage medium configured to store user data, a data path configured to transmit at least data between the mobile DSD and a host computer system, a housing having a machine readable optical code and a controller. The controller is configured to receive, from the data path, a request to restore the mobile DSD to factory settings. The controller also receives, from the data path, a unique access passcode derived from the machine readable optical code. The controller validates the unique access passcode, and, in response to determining that the unique access passcode is valid, restores the mobile DSD to factory settings.

20 Claims, 8 Drawing Sheets

RESTORE TO FACTORY SETTINGS OF A MOBILE DATA STORAGE DEVICE

TECHNICAL FIELD

This disclosure relates to restore to factory settings functionality of a data storage device, and particularly embedded multimedia or similar small-scale mobile data storage devices.

BACKGROUND

Data storage devices (DSDs) are electronic devices with the capability to store information in the form of digital data. DSDs are typically deployed as an integrated part of, or as a removable component configured to interface with, a computing system for the purpose of improving the data transmission and storage capabilities of the computing system. From the perspective of the computing system, a DSD is typically implemented as a block storage device where the data stored is in the form of one or more blocks, being sequences of bytes or bits having a maximum length, referred to as block size.

The DSDs are connectable to a host computer system via a data path operating over a particular connectivity protocol (e.g., via Universal Serial Bus (USB) cable). In response to the data path being connected to the host computer system, the host computer system recognizes the DSD as a block data storage device such that the host computer may also access the storage of the drive. Access to the DSD typically enables a user to access (e.g., read, write and/or modify) user data stored on the DSD and enables a manufacturer to send computer-readable instructions to control the DSD, such as instructions to restore to factory settings.

Mobile DSDs are commonly used in host computing systems in the form of a mobile device, such as a smartphone, a camera, a tablet, a GPS system, an eReader, a voice recorder, an automotive electronics system, and an Internet of Things (IoT) device. Mobile DSDs may also configured to connect to conventional full-scale computing devices, such as computer workstations and servers, by the use of adapters or similar components. The mobile DSDs includes but not limited to Universal Flash Storage (UFS), embedded MultiMediaCard (eMMC), UFS-Based Multi-Chip Package (uMCP) and embedded Multi-Chip Package (eMCP). A mobile DSD is commonly small in physical size and, in some applications, is attached to the host computing system in a fixed or non-removable way (e.g., as soldered onto the printed circuit board (PCB) or other internal part of the computing system).

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Disclosed herein is a mobile data storage device (DSD) comprising: a non-volatile storage medium configured to store user data; a data path configured to transmit at least data between the mobile DSD and a host computer system; a housing having a machine readable optical code; a controller to: receive, from the data path, a request to restore the mobile DSD to factory settings; receive, from the data path, a unique access passcode derived from the machine readable optical code; validate the unique access passcode; and in response to determining that the unique access passcode is valid, restore the mobile DSD to factory settings.

In some embodiments, the controller validates the unique access passcode by: generating a cryptographic access passcode by applying one or more cryptographic functions to the unique access passcode; comparing the cryptographic access passcode with an internal security passcode; and in response to determining that the cryptographic access passcode matches the internal security passcode, determining that the unique access passcode is valid.

In some embodiments, the machine readable optical code encodes access passcode data related to the unique access passcode.

In some embodiments, the unique access passcode is derived by a computing device configured to: extract the access passcode data by reading the machine readable optical code; and process the access passcode data to determine the unique access passcode.

In some embodiments, the extracted access passcode data includes a representation of the unique access passcode.

In some embodiments, the representation of the unique access passcode is a secure representation of the unique access passcode, wherein processing the access passcode data includes applying a decoding or decryption function to the secure representation of the unique access passcode.

In some embodiments, the access passcode data includes a uniform resource locator (URL) directing to a web server, wherein processing the access passcode data causes the web server to provide the unique access passcode to the computing device.

In some embodiments, the provision of the unique access passcode to the computing device by the web server is in response to completion of one or more user authentication processes.

In some embodiments, the computing device is configured to transmit the determined the unique access passcode to the host computer system.

In some embodiments, the computing device is a computing device of the host computer system.

In some embodiments, the restoring the mobile DSD to factory settings comprises: disabling one or more security functionalities configured in the mobile DSD; and removing all the user data from the non-volatile storage medium.

In some embodiments, the mobile DSD is configured to connect to the host computer system via a data connector of the mobile DSD that is configured to be in connection with the data path.

Also disclosed herein is a method for restoring a mobile data storage device (DSD) to factory settings, the method executed by a controller of the mobile data storage device and comprising: receiving, from a host computer system, a request to restore the mobile DSD to factory settings; receiving, from the host computer system, a unique access passcode derived from a machine readable optical code of the mobile DSD; validating the unique access passcode; and in response to determining that the unique access passcode is valid, restoring the mobile DSD to factory settings.

In some embodiments, validating the unique access passcode comprises: generating a cryptographic access passcode by applying one or more cryptographic functions to the unique access passcode; comparing the cryptographic access passcode with an internal security passcode; and in response to determining that the cryptographic access passcode matches the internal security passcode, determining that the unique access passcode is valid.

In some embodiments, the unique access passcode is derived by a computing device configured to: extract the access passcode data from the optical scan representation of the machine readable optical code; and process the access passcode data to determine the unique access passcode.

In some embodiments, the extracted access passcode data includes one of: the unique access passcode; and a secure representation of the unique access passcode, wherein processing the access passcode data includes applying a decoding or decryption function to the secure representation of the unique access passcode.

In some embodiments, the access passcode data includes a uniform resource locator (URL) directing to a web server, wherein processing the access passcode data causes the web server to provide the unique access passcode to the host computer system.

In some embodiments, the provision of the unique access passcode by the web server is in response to completion of one or more user authentication processes.

In some embodiments, the restoring the mobile DSD to factory settings comprises: disabling one or more security functionalities configured in the mobile DSD; and removing all the user data from the non-volatile storage medium.

Further disclosed herein is a data storage device (DSD) comprising: means for storing user data; means for transmitting at least data between a host and the data storage device; means for having a machine readable optical code; means for receiving, from the means for transmitting at least data between the host and the data storage device, a request to restore the mobile DSD to factory settings; means for receiving, from the means for transmitting at least data between the host and the data storage device, a unique access passcode derived from the machine readable code; means for validating the unique access passcode; and means for restoring, in response to determining that the unique access passcode is valid, the mobile DSD to factory settings.

BRIEF DESCRIPTION OF DRAWINGS

Some embodiments are described herein below with reference to the accompanying drawings, wherein.

DESCRIPTION OF EMBODIMENTS

Figure 1A:
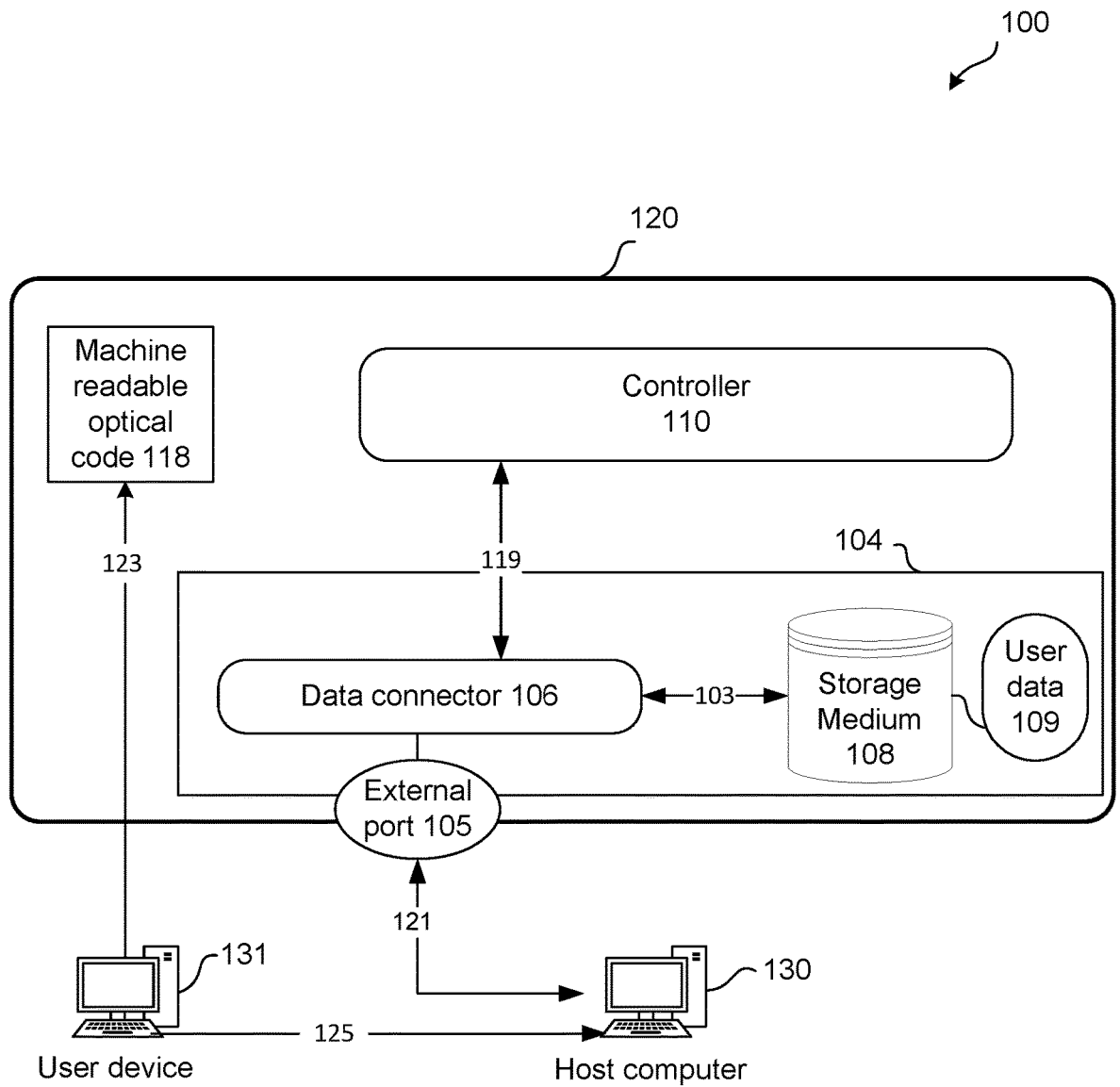
FIG. 1a illustrates an example mobile data storage device (DSD) according to one embodiment.

In some cases, it may be desirable to perform a "Restore to Factory Settings" (RTFS) operation on a mobile data storage device (DSD). A RTFS operation, also referred to as a "factory reset", a "hard reset" or a "master reset", typically involves a restoration of an electronic device to its original system state. For a mobile DSD, the goal of an RTFS operation is, in general, to erase all of the information stored on the internal storage medium, such as to enable, for example, the DSD to be programmed with new configurations, settings, or data. For example, a manufacturer may wish to restore the factory settings of a mobile DSD in order to refurbish the data storage device and/or an associated host computing system.

Restoring a mobile DSD to factory settings involves erasing data from the device, including both user data stored on the storage medium and any configuration settings applied to the device. For example, in some mobile DSDs performing a factory reset may include: erasing and sanitizing all the user data stored in the user data blocks on the storage medium of the mobile DSD; cleaning garbage collection blocks; removing all the logical addresses directing to user data such as the mapping schemes (e.g., Flash Translation Layer (FLL)); and/or resetting all the functionalities of the mobile DSD to original status.

However, various technologies implemented in mobile DSDs increase the difficulty of permanently, completely and irretrievably removing the data from a mobile DSD as part of a factory reset. Specifically, many mobile DSDs have security functionality that, for example, enables a user to define protected areas or create policies for controlling the storage and access to user data of the DSD. Although these security techniques provide utility by protecting user data stored within the mobile DSD, they may be detrimental to the effective execution of a restore to factory settings operation for the device.

For example, security techniques that may impact on the ability to perform a factory reset on a mobile DSD include, but are not limited to: Replay Protected Memory Block (RPMB) techniques that enable a mobile DSD to store data in a specific area that is authenticated and protected against replay attack; Device Configuration Lock techniques that can block unauthenticated users from accessing or changing the configuration of the mobile DSD, and/or the user data stored on the device (e.g., while still enabling access to some other selected data storage areas of the medium and/or functions of the device); and Write Protect techniques that involve the definition of particular protected storage areas, or partitions, of the storage medium for which stored data cannot be erased or written without a corresponding Write Protect key (however, unlike for device configuration lock security, data in write protected areas may still be read).

Another factor contributing to the difficulty of restoring a mobile DSD to factory settings is the physical structure and configuration of mobile DSDs and associated mobile devices that the mobile DSDs are commonly used with. Mobile DSDs such as UFS, eMMC, uMCP and eMCP are typically in the form of microchips (e.g., with a dimension of 9 mm to 13 mm) that are installed into an associated mobile device by a permanent or semi-permanent attachment means, for example by a soldering of the mobile DSD on to a printed circuit board (PCB), or other circuits or components, of a mobile device.

Conventionally, performing a factory reset operation on a data storage device, such as an external portable storage drive, has involved physical removal of the device from the host computing system. However, this is undesirable for mobile DSDs since this may require, for example, determining the PCB layout of the associated mobile device and/or analyzing pinouts through PCB layer removal, applying a physical force to the mobile DSDs to detach it from the host computing system PCB, and connecting the detached mobile DSDs to a resetting adapter or other device.

Despite the above, achieving physical access to the mobile DSD to perform a RTFS operation may be desirable to validate the reset operation in the case that the operation is to be performed on a DSD with one or more of the aforementioned security technologies. It is therefore desired to provide a mobile DSD that ameliorates one or more of these difficulties, or other difficulties of the prior art, or that at least provides a useful alternative.

Overview

With reference to FIG. 1*a*, there is disclosed an exemplary mobile data storage device (DSD) 100 including a housing 120 having a machine readable optical code 118 that is visible from the outside of the housing, and an controller 110 configured to restore the mobile DSD 100 to factory settings by (i) receiving data including one or more machine readable (i.e., software) instructions from a data path 104, which is configured to transmit data between the mobile DSD 100 and at least one host computer system 130; (ii) validating the data received from the host computer system 130; and (iii) in response to determining that the received data is valid, restoring the mobile DSD to factory settings. The restore to factory settings (RTFS) functionality is performed by the controller 110 of the DSD 100, and involves disabling the security functions of the mobile DSD 100 and removing all the user data from the storage medium 108. This enables a user to achieve a controlled and secure reset of the state of the mobile DSD 100, thereby performing a RTFS operation irrespective of any previously configured security settings.

Specifically, in the described embodiments the mobile DSD 100 receives data including a request for a RTFS operation to be performed on the device 100 and a corresponding unique access passcode (UAP). The mobile DSD 100 is configured to perform the RTFS operation only in response to a positive validation of the UAP value. Validation of the UAP value involves matching an encoded, encrypted or otherwise secured pre-specified value of the UAP data against a corresponding secure representation of the received UAP value. This enables a "proof of physical device access" type validation for performing the restoration while preserving the confidentiality of the stored UAP (i.e., since only the secured form of the value is held within the mobile device 100).

The received UAP value is derived from a physical identifier attached to the device 100. In the embodiments described herein, the physical identifier is a machine readable optical code 118, such as a Quick Response (QR) code, matrix code, 2D bar code, or any other type of similar code. The machine readable optical code 118 encapsulates or encodes access passcode data including information related to the UAP and, in some embodiments, information related to the mobile DSD 100 (such as a device key value). One or more computing devices may be configured to read the machine readable optical code of the mobile DSD 100, such as for example by the use of a scanning device and a corresponding software application.

For example, in one configuration the access passcode data is retrieved by a user device 131 configured to read or scan the machine readable optical code 118 of the mobile DSD 100. The user device 131 may be a manufacturer computing device such as a workstation system (e.g., for a manufacturer or vendor user), or an end-user device such as a smartphone or tablet (e.g., for a commercial end-user) depending on the use case of the desired reset to factory setting operation. In such configurations, the UAP is determined by the user device and is subsequently transmitted to the host computer 130.

In another configuration, the host computer 130 is configured to scan the machine readable optical code 118 to obtain the access passcode data, derive the UAP from the access passcode data and send a request for a RTFS operation to the controller 110 with the derived UAP value. The machine readable optical code 118 is configured, or arranged, relative to the housing 120 such that the machine readable optical code 118 is readable by the host computer 130, and/or the user device 131, while a connection is maintained between the mobile DSD 100 and the host computer system 130 via the data path 104. This enables an ability to conduct physical device access based validation of the RTFS operation without a corresponding requirement of disconnecting the mobile DSD from the associated host computing system.

The access passcode data is extracted and processed by the computing device to determine the UAP value encoded by the machine readable optical code 118 of the mobile device 100. In one example configuration, the access passcode data includes a representation of the UAP, either directly (i.e., as the passcode value itself), or indirectly. An indirect representation may include an encoded, encrypted or otherwise secured form of the UAP value. The secured form of the UAP encoded within machine readable code 118 may differ from the secured value held within the device 100 used for validation. In such embodiments, determination of the UAP involves applying a decoding or decryption function to the access passcode data. Securing the decoding or decryption function (e.g., via the use of a private key known only by an authorized host computer 130 or user computer device 131) thereby further secures the RTFS functionality of the mobile DSD 100 against being performed by an unauthorized party.

In another example configuration, the access passcode data includes a reference to a location of the of the UAP in an external system or hardware component, such as a link, pointer, memory address, network address, or any other similar mechanism for specifying a data locality. For example, in the described embodiments, the access passcode data includes a uniform resource locator (URL) directing to a web server (not shown) configured to provide the UAP to the computing device processing the data. In some embodiments, the external system is configured to control the provision of the UAP value subject to one or more authentication or security mechanisms. For example, a user may be required to provide login credentials to an account of the web server in order to demonstrate that they are authorized to obtain the UAP value enabling a RTFS operation on the mobile device 100.

The methods, systems, and devices described herein provide a platform for restoring a mobile DSD 100 to factory settings that has the following advantageous properties: (i) using optical encoding techniques to secure the physical access based RTFS functionality of the device, by representing UAP values in a space-efficient manner physically on the mobile DSD 100 (i.e., to enable the use of large UAP lengths despite the small size of the device); (ii) in conjunction with (i), enabling restoration of a mobile DSD 100 to factory settings without requiring physical disconnection from the host computing system, or the application of any significant physical stresses to the mobile DSD 100; (iii) providing a mechanism for the controlled removal of all stored user data, thereby protecting the data from being recovered by malicious third parties and enabling manufacturers, or end-users, to refurbish the mobile DSD 100, irrespective of the security settings of the device 100; (iv) providing a secure mechanism for the validation of received RTFS requests from a host computer 130 involving an internal security passcode that is unique for each mobile DSD 100, and that is stored within the device 100 in a secured form (i.e., such that it cannot be changed within the mobile DSD 100, or retrieved from the device by reverse engineering); and (v) in some embodiments, securing the process of deriving the UAP value from the machine readable optical code of the device 100, such that, when combined with (i) above, a type of two-factor authentication is enforced to secure the RTFS operation against being performed by an unauthorized user.

Mobile Data Storage Device (DSD)

FIG. 1*a* shows an embodiment of the mobile DSD 100 comprising a data path 104, a data connector 106, a controller 110 and a housing 120 having a machine readable optical code 118. The data connector 106 comprises one or more external ports, pins, or other connectors 105 (shown as an external port 105) configured to transmit data between a host computer 130 and the mobile DSD 100.

The external port 105 forms part of the data path 104 and is configured to be in connection with the host computer 130 (e.g., via a data flow 121) that is configured to include a device driver and a data interface, which enables communication between the host computer 130 and the mobile DSD 100 over the data connector 106. The controller 110 includes control operations to send, receive and process data and control commands according to one or more protocols, and to provide other general device functionality.

In some embodiments, the host computer 130 is a full scale computing device, such as a workstation or server computer, and the mobile DSD 100 is configured to connect with the host computer 130 via an adapter component that interfaces with the external port 105 of the mobile DSD 100. For example, the mobile DSD 100 may be in the form of a standalone device-removable flash card that is configured for insertion into a portion of a USB adapter. The adapter interfaces the data connector 106 of the mobile DSD 100, via the external port 105, to a USB connection module (e.g., a hub implementing USB-A, USB-8, USB-C, mini-USB, micro-USB, USB-UFS, etc.) of the host computer 130 (e.g., by plugging a USB connector portion of the adapter into a data port the host computer 130).

In some embodiments, the host computer 130 is a mobile device and the mobile DSD 100 is configured to connect to the host computer 130 via direct interaction between the external port 105 and one or more electronics circuits and/or other physical components of the host computer 130. For example, a mobile DSD 100 in the form of an eMMC may connect to a host computer 130 (e.g., a smartphone) via a permanent soldering of pins of the external port 105 to one or more pinouts of a PCB of the host computer 130. Alternatively, a mobile DSD 100 in the form of a standalone device-removable flash card may be configured for insertion into a card reader slot of the host computer 130, which may or may not be a mobile device.

In other embodiments, the host computer 130 is implemented as an external computing system (e.g., including a manufacturer workstation or server computer) that is different to an associated mobile device (e.g., a smartphone) in which the mobile DSD 100 is installed. In such case, the mobile DSD 100 is configured to connect with the host computer 130 via a corresponding connection between the associated mobile device and the host computer 130, for example, via a data cable connecting a data port of the associated mobile device (e.g., a USB Type-C port) and a data port of the host computer 130 (e.g., a USB Type-A port). The connection enables the host computer 130 to communicate with the mobile DSD 100 via the associated mobile device of the mobile DSD 100 (i.e., where the host computer 130 issues instructions and commands to an operating system or software application of the mobile device, causing corresponding commands to be sent from the associated mobile device to the mobile DSD 100).

The mobile DSD 100 is configured to register with the host computer 130 such as to enable the host computer 130 to send one or more machine readable instructions to restore the mobile DSD 100 to factory settings. The mobile DSD 100 further comprises storage medium 108 to store user specific data 109, such as user content data, garbage collection data, logical mapping data and user-specific configuration settings data. The user content data includes one or more blocks of data organized into files, for example including images, documents, videos, etc.

The storage medium 108 is non-transitory such as to retain the stored block data irrespective of whether the medium 108 is powered. The medium 108 may be a UFS, eMMC, uMCP, eMCP, or any other non-volatile storage media for mobile DSDs. Further, the storage medium 108 may be a block data storage device, which means that the user content data 109 is written in blocks to the storage medium 108 and read in blocks from the storage medium 108.

The connection of the host computer 130 to the mobile DSD 100 enables the mobile DSD 100 to perform the restore to factory settings functionality through the computer readable instructions sent from the host computer 130 without requiring physical removal of the mobile DSD 100 from the electronics circuits and other physical operations. The computer readable instructions may be in the form of standard Small Computer System Interface (SCSI) commands, UFS commands, such as a WRITE BUFFER command for testing logical unit memory in the SCSI target device (e.g., the mobile DSD 100) and the integrity of the service delivery subsystem, and any other form suitable for computers and mobile DSDs.

In some embodiments, specialized software may be installed on the host computer 130 for sending the one or more machine-readable instructions to the mobile DSD 100, including operations to perform the restore to factory settings functionality. The specialized software may further be configured to monitor and present information in relation to restoring the mobile DSD 100 to factory settings such as status, progress and results.

In some embodiments, the UAP can be determined by another computer device, such as a user device 131. For example, the user device 131 may be operated to scan the code 118, extract the encoded information (i.e., access passcode data), process the extracted data to determine the UAP, and transmit the UAP to the host computer 130 that is connected to the mobile DSD 100. The user device 131 may be operated by a vendor, manufacturer, or end-user, and may interface with the host computer 130 through one or more software applications executing on one or more of the devices 130, 131. (e.g., via a data flow 125).

The controller 110 is configured to perform the functionality of restoring the mobile DSD 100 to factory settings. That is, according to the methods described herein, the controller 110 receives the request to restore the mobile DSD 100 to factory settings and the UAP, validates the UAP, and subsequently issues commands to the data path components to restore the mobile DSD 100 to factory settings (i.e., following the determination of the UAP as valid) such as to disable the security functionalities configured in the mobile DSD 100 and remove all the user data from the non-volatile storage medium 108 of the mobile DSD 100.

Figure 1B:
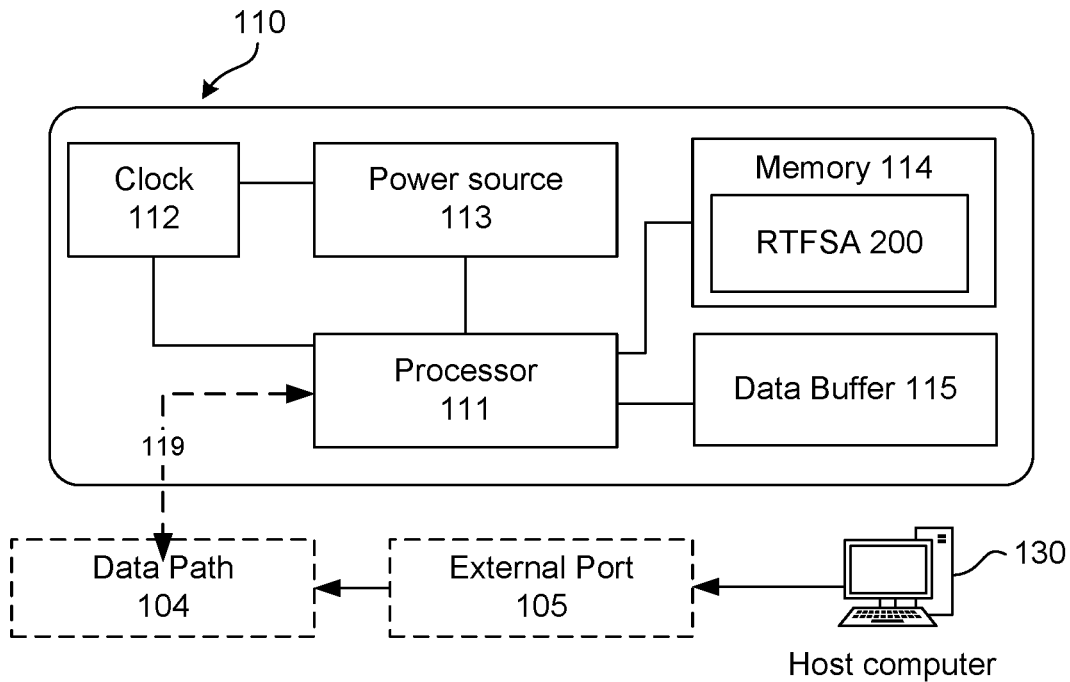
FIG. 1b is a block diagram of an exemplary configuration of a restoring to factory settings application (RTFSA) executed by a controller of the mobile DSD according to one embodiment.

FIG. 1b illustrates an exemplary embodiment of the controller 110 which includes: a processor 111; a clock 112 in communication with the processor 111; memory modules in the form of a system memory 114 and data buffer 115 configured to exchange data with the processor 111 and to store the data received from the host computer 130 computer temporarily; and a power source 113 in the form of an internal battery configured to power to supply power exclusively to components of the controller 110. Data flow 119 exists between the processor 111 and the data path 104. The processor 111 is configured to execute program code stored within the system memory 114 to issue commands for controlling the operation of the mobile DSD 100.

The system memory 114 further includes a Restoring to Factory Settings Application (RTFSA) 200 to perform the functionality of restoring the mobile DSD to factory settings. The RTFSA 200 may be a microprogram executed by the controller 110 to receive data, validate data and restore the mobile DSD 100 to factory settings based on the control commands and/or data received from the data path 104 by the processor 111. Execution of the RTFSA 200 thereby enables control, by the host computer 130, over the restoration to factory settings of the DSD 100 by instructing the controller 110 to disable the security functionalities configured in the mobile DSD 100 and to remove all the user data from the storage medium 108.

Figure 1C:
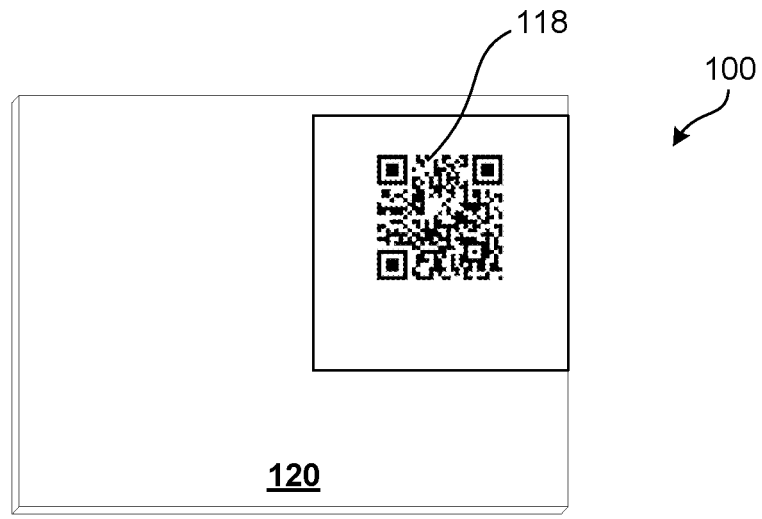
FIG. 1c illustrates a perspective view of the mobile DSD comprising a housing and a visible machine readable optical code according to one embodiment.

FIG. 1c illustrates an embodiment of a mobile DSD 100 including a housing 120 that has a visible machine readable optical code 118. The housing 120 is typically any suitable outer material that is able to encapsulate the required components of the mobile DSD 100 within the housing 120 while still enabling a connection to a computing device, such as the host computer 130 (e.g., by a connection between the external port 105 and the host computer 130).

For example, the housing 120 may be a soft plastic film or a hard plastic casing covering all components of the mobile DSD 100, leaving an opening for the external ports 105. The machine readable optical code 118 can be physically secured to the housing 120 in any number of ways. For example, the machine readable optical code 118 can be printed on a surface of the housing 120, etched into the surface of the housing 120, or printed onto an adhesive label that is adhered to the surface of the housing 120. The machine readable optical code 118 may further have anti-fade or other features to reduce wear, damage or degradation to the code 118 in response to physical stresses (e.g., friction) and environmental effects (e.g., exposure to temperature, light, moisture, and/or air).

The machine readable optical code 118 is referred to as "visible" if it is visually perceivable by a human observer. Otherwise, the code 118 is considered to be "invisible", in the sense of being visually imperceptible by a human observer, but may be still machine readable. In the described embodiments, the machine readable optical code 118 is a visible code, and is formed and arranged relative to the housing 120 such that the code 118 is observable from at least one human viewable perspective, and machine readable, while the DSD 100 is connected to the host computer 130. This enables a computing device, such as the user device 131, to read the machine readable optical code 118 without disconnection of the mobile DSD 100 from the host computer 130.

The machine readable optical code 118 is advantageous in that it can be encoded with information capable of representing a large UAP value (e.g., maximum 3 kb for a QR code) whilst being small in physical size and therefore suitable for attachment to a surface of a mobile DSD 100 that is in the form of microchip. Moreover, in some embodiments, the machine readable optical code 118 may be decoded even if it is partially damaged or incomplete, owing to the error correction methods used in the encoding techniques.

The machine readable optical code 118 is encoded with access passcode data related to the UAP. For example, the UAP may be configured to be in the form of a 16 character, or longer, alphanumerical string and is encoded into access passcode data by an encoding technique (as shown in FIG. 1c). The encoding technique is dependent on the form, size and desired information encoded into the access passcode data. Exemplary machine readable optical code 118 may include, for example a SnapTag, a bar code, a MaxiCode, a PDF417 code, a High Capacity Color Barcode (HCCB) and a Data, with corresponding encoding techniques including Reed Solomon algorithms (for encoding a QR code and MaxiCode), and image based encoding (for encoding a SnapTag).

In the described embodiments, the machine readable optical code 118 can be decoded by the host computer 130 or the user device 131 (referred to generally as computer devices 130, 131). Decoding the machine readable optical code 118 may include receiving a scanned representation of the visible machine readable optical code 118, applying decoding algorithms to the scanned visible machine readable optical code 118 performed by one or more processors of the computer device 130 or 131 and outputting the decoded results.

In the described embodiments, the computer devices 130, 131 are configured to capture the scanned machine readable optical code from the housing 120 performed by a image capturing device (e.g., a camera) of the computer devices 130, 131, for example via a data flow 123. The host computer 130 or user device 131 is further configured to derive the UAP from the scanned machine readable optical code by the above decoding process. Then, the host computer 130 is configured to send the RTFS request and the UAP to the controller 110 via the data path 104.

In some embodiments where the additional user device 131 is used for capturing a scan of or decoding the visible machine readable optical code 118, the user device 131 is further configured to transmit the scan or the derived UAP to the host computer 130. For example, the user device 131 may be a smartphone or tablet (e.g., operated by an end-user) which is configured to send the UAP to the host computer 130 (e.g., a desktop computer or other mobile device of the end-user). Alternatively, the user device 131 may be a first workstation device configured to scan the housing of the DSD 100, and to communicate the determined UAP to a second workstation device (the host computer 130) connected to the mobile DSD 100 via data path 104, where both the devices 130, 131 are part of a system for automating the process of resetting the mobile DSD 100 (i.e., where the user is a manufacturer or vendor of the device 100).

In some examples, the user device 131 may be configured to provide a visual indication of the UAP to a user, such as by a display screen of the device 131, thereby enabling the user to manually enter the UAP into the host computer 130 (e.g., via input components, such as a keyboard).

Figure 2:
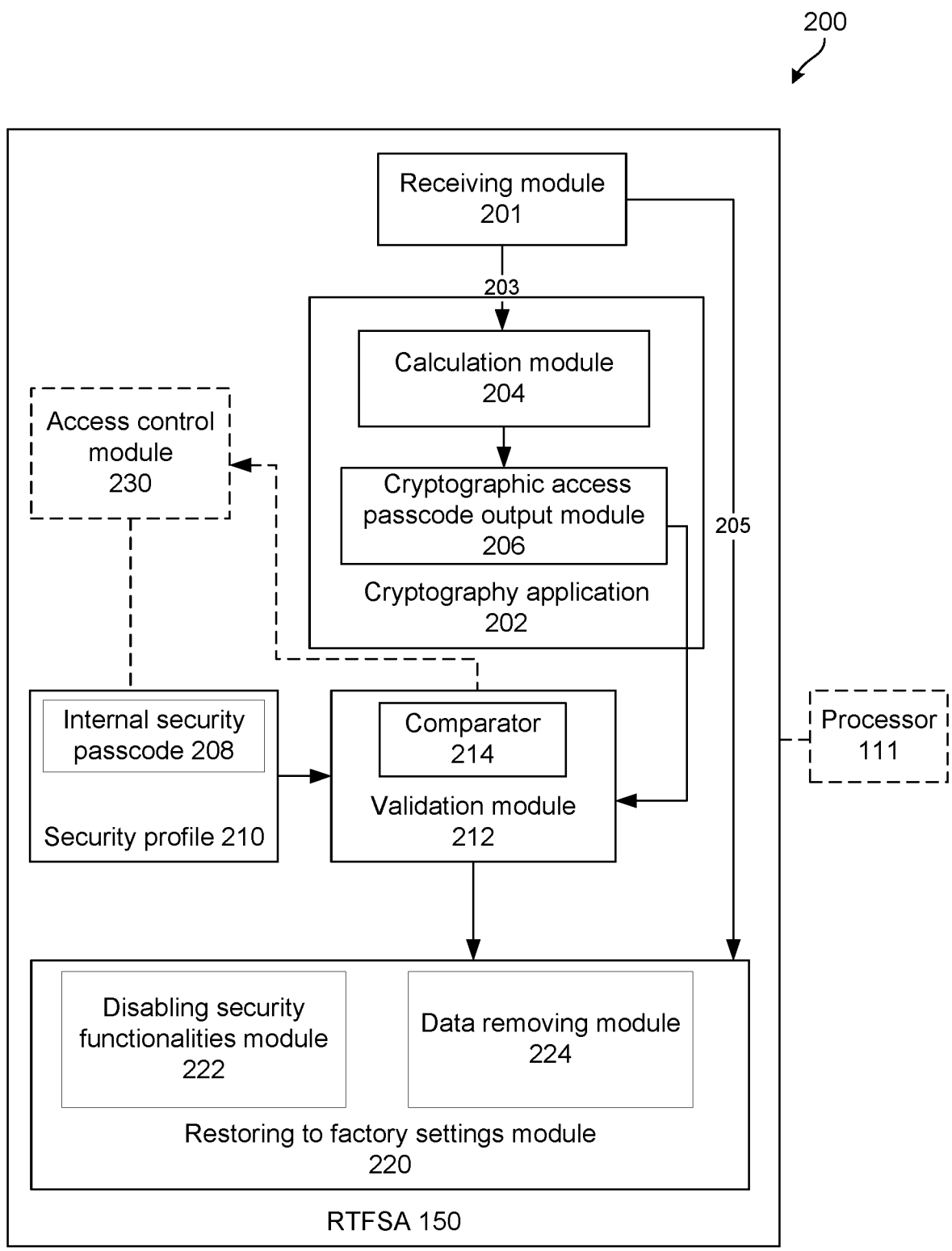
FIG. 2 is a block diagram of an exemplary configuration of the RTFSA to validate the unique access passcode according to one embodiment.

FIG. 2 illustrates an exemplary configuration of the RTFSA 200, including: a receiving module 201, a cryptography application 202, a security profile 210 and a validation module 212, and a restoring to factory settings module 220. In some embodiments, the RTFSA 200 also includes an access control module 230 configured to control the access of the host computer 130 in response to a determination of the validity of the UAP by the validation module 212.

The receiving module 201 of the RTFSA 200 is configured to receive machine readable instructions and other data, such as the request and (potentially) further executing commands to restore the mobile DSD 100 to factory settings and the UAP from the connected host computer 130 via external port 105, as depicted in FIGS. 1a and 1b. The receiving module 201 is adapted to process a data stream 119 to generate data associated with restoring the mobile DSD 100 to factory settings. The receiving module 201 is further configured to transmit the UAP to the cryptography application 202 via a data stream 203, as well as transmit the request and the (potentially) further executing commands to restore the mobile DSD 100 to factory settings to the restoring to the factory settings module 220 via a data stream 205.

The security profile 210 is configured to store the security information of the mobile DSD 100. In some embodiments, the security profile 207 is implemented as a table or list in a corresponding system security file or data block. The data stored by the security profile 210 includes fixed data values, such as an internal security passcode 208. In some embodiments, the security profile 210 also includes other adjustable data values, such as one or more predetermined upper thresholds for the acceptable number of invalid UAP being input by the same host computer in different scenarios.

The cryptography application 202 and the validation module 212 perform the validation of the UAP. The validation process includes retrieving the internal security information from the security profile 210. In some embodiments, the cryptography application 202 includes a calculation module 204 that is configured to apply one or more cryptographic functions (e.g., a hash algorithm) to the UAP. The calculation module 204 may include calculation circuits or components, such as adders, binary multipliers and/or advanced Field Programmable Gate Arrays (FPGAs) with powerful calculation capabilities. The calculation module 204 generates a cryptographic access passcode by applying the one or more cryptographic functions to a UAP value.

In some embodiments, the cryptography application 202 includes a cryptographic access passcode output module 206 configured to receive the cryptographic access passcode generated by the calculation module 204 and send the cryptographic access passcode to the validation module 212. The cryptographic access passcode output module 206 may include a non-volatile storage medium to at least store the cryptographic access passcode.

The validation module 212 is configured to validate the UAP. In some embodiments, the validation module 212 includes a comparator 214 (e.g., in the form of electronic circuits or integrated components) configured to compare information relevant to the UAP and internal secure information stored in the mobile DSD 100. In some embodiments, the validation module 212 is configured to compare the cryptographic access passcode with the internal security passcode 208 stored in the security profile 210. For example, in response to the determining that the cryptographic access passcode is the same as the internal security passcode 208, the validation module 212 determines that the UAP is valid. Otherwise, in response to the determining that the cryptographic access passcode is different from the internal security passcode 208, the validation module 212 determines that the UAP is invalid. Subsequently, the validation module 212 sends the validation result to the restoring to factory settings module 220.

In some embodiments, in response to determining that the UAP is invalid, the validation module may send the validation result to the access control module 230. In some cases, the access control module 230 subsequently increments a number of invalid access passcodes input by the host computer maintained by the RTFSA 150, and determines whether the number of invalid access passcodes has reached one or more predetermined upper thresholds stored in the security profile 210. In response to determining that one or more of the predetermined upper thresholds are reached, the access control module 230 may further control the access of the host computer 130 to the functionality of the mobile DSD 100, based on the number of invalid access passcodes. Controlling the access of the host computer 130 may include one or more of: requiring re-authentication of the host computer 130, reducing the accessibility permissions for the host computer 130 and blacklisting the host computer 130.

The restoring to factory settings module 220 executes the process of restoring the mobile DSD 100 to factory settings. In some embodiments, the restoring to factory settings module 220 includes a disabling security functionalities module 222 and a data removing module 224. In some embodiments, the restoring to factory settings module 220 receives one or more machine readable instructions from the receiving module 201 via the data stream 205 while restoring the mobile DSD 100 to factory settings.

The disabling security functionalities module 222 disables the one or more security functionalities configured in the mobile DSD 100 during the process of restoring the mobile DSD 100 to factory settings. The security functionalities may include: RPMB functions involving a shared key and the application of a HMAC (Hash Massage Authentication Code), which is used to sign all the read/write operations accessing a secured area; Device Configuration Lock functions that prevent unauthenticated users from changing the configuration of the mobile DSD 100; and Write Protect functions that protect against data corruption or erasure (whether malicious or unintentional).

The data removing module 224 permanently, completely and irretrievably removes all the user data from the non-volatile storage medium of the mobile DSD 100. In some embodiments, the data removing module 224 has access to different blocks of the non-volatile storage medium 108, such as the user data blocks, the blocks storing logical addresses directing to each user data block, garbage collection blocks and other blocks configured to store the user-specific configuration settings. In some implementations, the data removing module 224 is configured to remove unmapped physical blocks which could also contain some old or stale data which is no longer mapped to the logical user data blocks. The data removing module 224 may further remove all the data from the blocks in a predefined or adaptively determined sequence.

Restoring Mobile DSD to Factory Settings

Figure 3A:
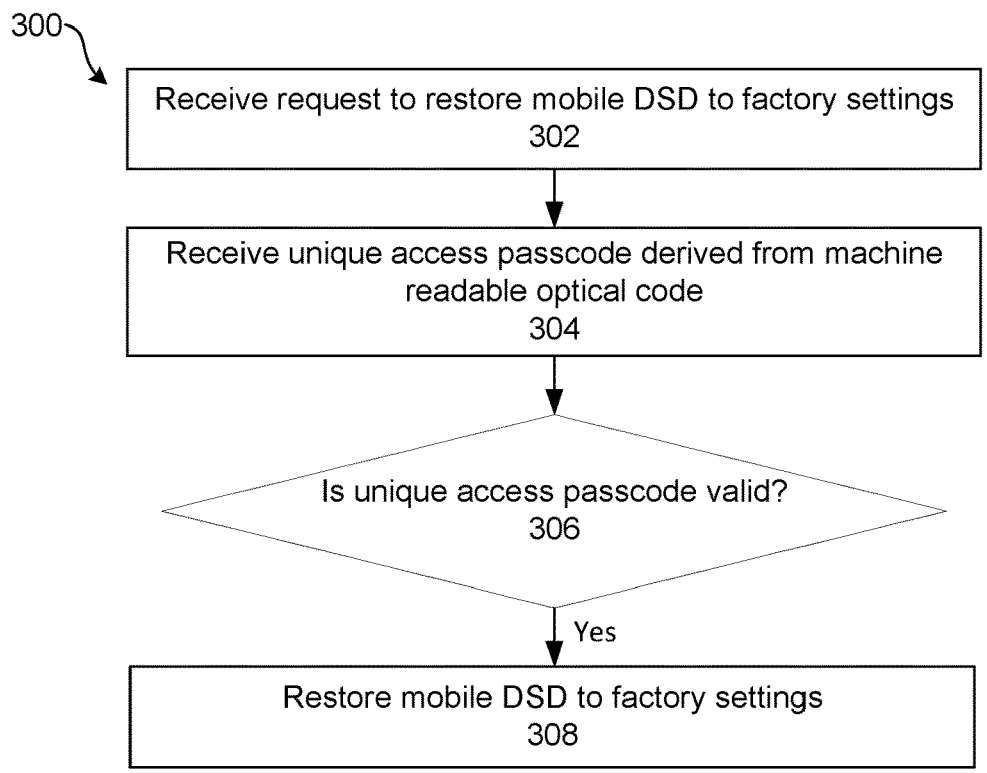
FIG. 3a illustrates a flow diagram of a process for restoring the mobile DSD to factory settings according to one embodiment.

FIG. 3*a* illustrates a process 300 for restoring the mobile DSD 100 to factory settings, as executed by the controller 110. Embodiments of the process 300 described herein relate to the receiving of a request and a UAP provided by the host computer 130 to the mobile DSD 100, the validation of the UAP, and the restoration of the mobile DSD 100 to factory settings.

At steps 302 and 304, the RTFSA 200 receives (e.g., by the receiving module 201) a request to restore the mobile DSD to factory settings and a UAP from the host computer 130 via the external port 105, as depicted in FIGS. 1*a*, 1*b* and 2. The host computer 130 may be a mobile device configured to connect directly with the mobile DSD 100, or a device of an external system configured to connect to the mobile DSD 100 via the mobile device. Alternatively, the host computer 130 may be configured with an adapter to connect to the mobile DSD 100 without an associated mobile device.

In some embodiments, step 302 further includes processing the request to restore mobile DSD to factory settings, which may be written as a standard Small Computer System Interface (SCSI) command, UFS command or any other form suitable for the communication between the host computer 130 and the mobile DSD 100. Step 302 may further include transmitting the request to the other components configured to execute a RTFS operation such as, for example, the restoring to factory settings module 220.

In some embodiments, step 304 further includes storing the UAP in a non-volatile storage medium and transmitting the UAP to the other components configured to validate the UAP, such as the cryptography application 202. In some embodiments, step 304 may further include converting a representation of the UAP value (e.g., ASCII text of a character string) to an alternative representation (e.g., a bit string) for the verification functions implemented by digital circuits and components.

At step 306, the RTFSA 200 determines the validity of the UAP received at step 304. The validation module 212, as depicted in FIG. 2, is configured to determine the validity of the UAP. As shown in FIG. 2, the determination of the validity of the UAP may be performed by the cryptography application 202 and the validation module 212 based on a cryptographic access passcode generated from the UAP.

In the described embodiments, validating the UAP includes: (i) applying one or more cryptographic functions to the UAP, such as applying a hash algorithm that maps the UAP of arbitrary size to a hash of a fixed size; (ii) generating a cryptographic access passcode based on the cryptographic functions; (iii) comparing (e.g., executed by a comparator of the controller 110) the cryptographic access passcode with an internal security passcode that is embedded in the mobile DSD 100 during manufacturing; (iv) in response to determining that the cryptographic access passcode matches the internal security passcode (e.g., the cryptographic access passcode bitwise equivalent to the internal security passcode), determining that the UAP received from the data path 104 is valid.

In some embodiments, the mobile DSD 100 may request re-entering the UAP in response to determining that the UAP is invalid, that is, the generated cryptographic access passcode does not match the internal security passcode. In some embodiments, the mobile DSD 100 may further control the access of the host computer 130, such as requiring re-authentication of the host computer 130, in response to determining that a number of invalid UAPs sent by the host computer 130 is greater than or equal to a predetermined threshold.

Figure 3B:
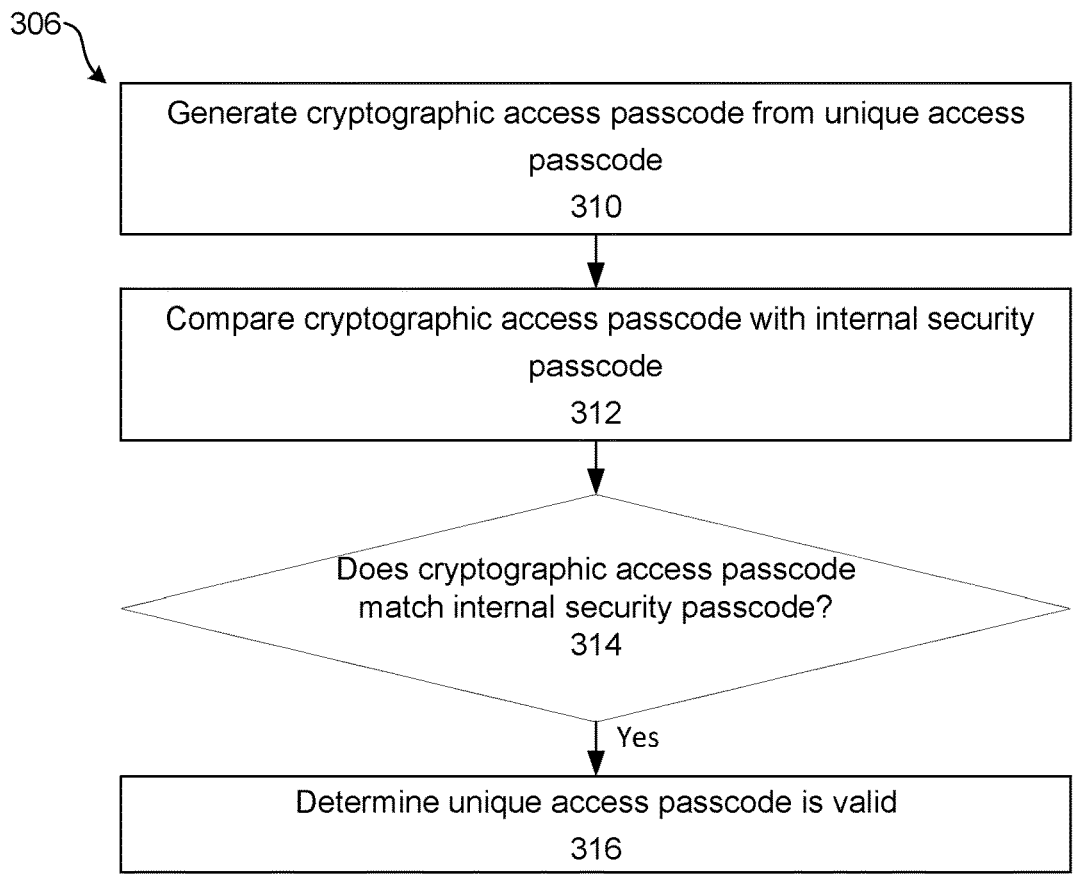
FIG. 3b illustrates a flow diagram of a process for validating a unique access passcode according to one embodiment.

FIG. 3*b* illustrates a process 306 for determining the validity of the UAP. In some embodiments, at step 310, the cryptography application 202 in the RTFSA 200 generates the cryptographic access passcode by applying one or more cryptographic algorithms or functions to the UAP. An advantage of applying the one or more cryptographic functions to the UAP is the significantly increased difficulty of reverse engineering the UAP value from the device 100 given that only the resulting encrypted or encoded representation of the UAP is stored. For example, in the case of using a one-way hash algorithm as the cryptographic algorithm, the generated cryptographic access passcode is infeasible to invert and accordingly cannot be retrieved from the mobile DSD 100.

The generation of the cryptographic access passcode at step 310 may include a plurality of calculations to implement one or more cryptographic functions performed by the calculation module 204. In some embodiments, step 310 may further include saving the cryptographic access passcode in a non-volatile storage medium and transmit the cryptographic access passcode to the other components configured to implement the validation (e.g., the validation module 212).

At step 312, the RTFSA 200 retrieves (e.g., by the validation module 212) an internal security passcode from the security profile 210 and compares the cryptographic access passcode generated at step 310 with the internal security passcode. At step 314, the RTFSA 200 further determines (e.g., by the validation module 212) whether the cryptographic access passcode is the same as the internal security passcode. In response to determining that the cryptographic access passcode is the same as the internal security passcode, at step 316, the RTFSA 200 determines that the UAP received at step 304 is valid.

Figure 3C:
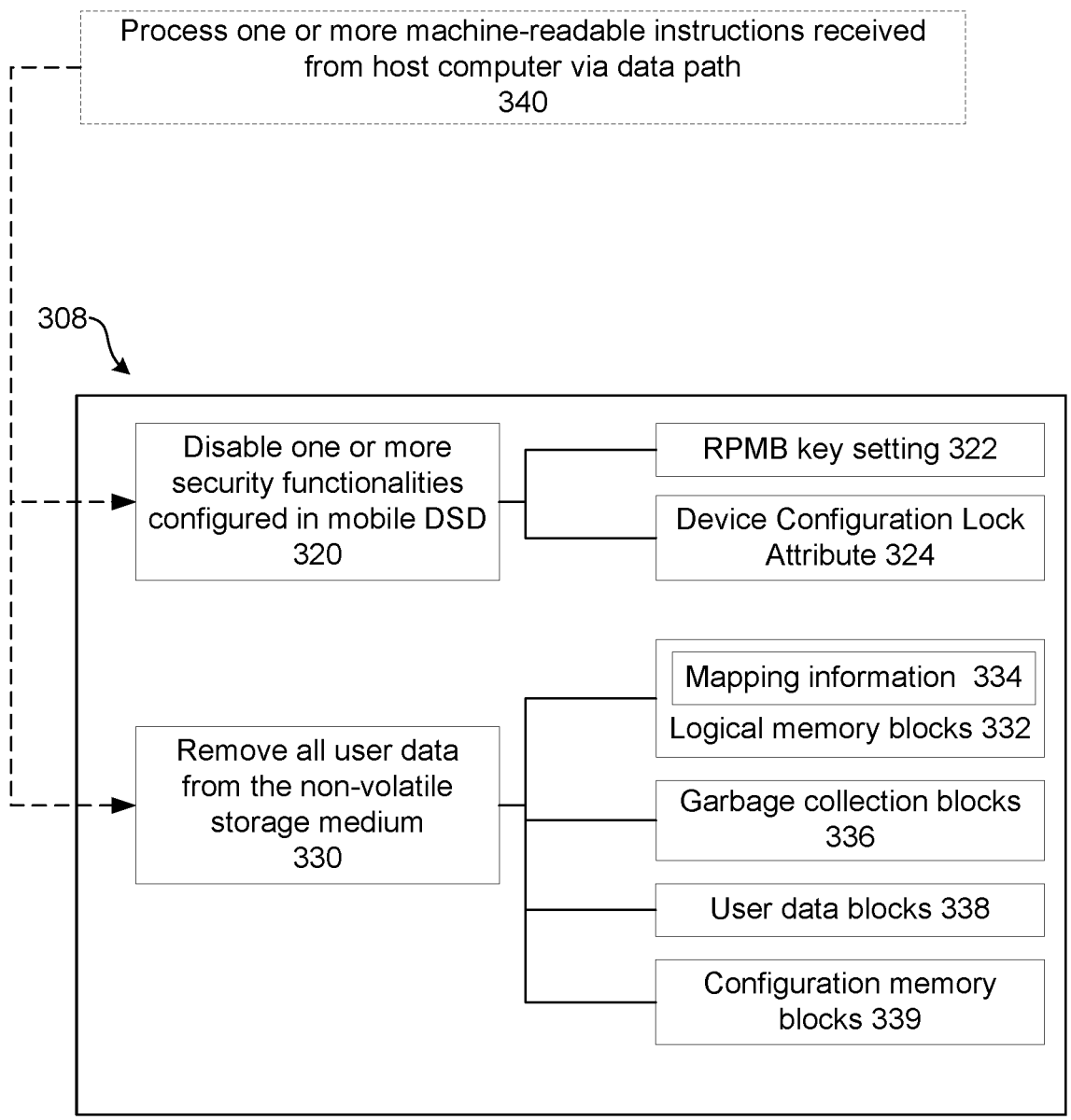
FIG. 3c illustrates a block diagram of a process for restoring the mobile DSD to factory settings according to one embodiment.

Referring back to FIG. 3*a*, at step 308, the RTFSA 200 performs restoring the mobile DSD 100 to factory settings. As shown in FIGS. 2 and 3*c*, restoring the mobile DSD 100 to factory settings may be performed by the restoring to factory settings module 220.

In the described embodiments, restoring the mobile DSD 100 to factory settings includes the controller 110 disabling one or more security functionalities configured in the mobile DSD 100 such as RPMB functions, the Device Configuration Lock functions, and/or Write Protect functions. Such security functionalities may prevent the user data stored in the DSD 100 from being erased or sanitized and prevent the mobile DSD 100 from being reset to initial configurations (e.g., by preventing a reset of the device configuration descriptors, or the erasing of protected areas or settings). The disabling of the one or more security functionalities of the mobile DSD 100 facilitates the following steps to restore the mobile DSD 100 to factory settings.

In the described embodiments, restoring the mobile DSD 100 to factory settings further includes the controller 110 permanently, completely and irretrievably removing all the user data from the non-volatile storage medium of the mobile DSD 100. The user data may include the data stored in the user data blocks, the logical addresses directing to user data, data in garbage collection blocks and other user-specific configuration settings.

In the described embodiments, the mobile DSD 100 is configured to connect to the host computer 130 via an external port 105 of the mobile DSD 100 that is in connection with a data path 104 operating over a particular connectivity protocol. In response to being connected to the host computer 130, the host computer 130 recognizes the mobile DSD such that a user may access the mobile DSD 100 via the data path 104. Access to the external port 105 typically enables the host computer 130 to access (e.g., read, write, modify and remove) user data stored on the non-volatile storage medium and send machine readable instructions to the controller 110 of the mobile DSD 100.

In the described embodiments, when performing the functionality of restoring the mobile DSD 100 to factory settings, the mobile DSD 100 is connected to the host computer 130 (via the external port 105) to receive one or more machine-readable instructions (e.g., in the form of standard SCSI commands or UFS commands) from the host computer 130. The controller 110 of the mobile DSD 100 is further configured to process and execute the one or more machine-readable instructions.

In such implementations, at step 320, the disabling security functionalities module 222 disables one or more security functionalities configured in the mobile DSD 100, including but not limited to an RPMB key setting 322, a Device Configuration Lock Attribute 324 and any encrypt or decrypt techniques configured by the controller 110.

In some embodiments, at step 330, the data removing module 224 removes all the user data from different blocks of the non-transitory storage medium 108, including but not limited to: the logical memory blocks 332 that may store mapping information 334 (e.g., Flash Translation Layer (FLL)), the garbage collection blocks 336, the user data blocks 338 and the configuration memory blocks 339 storing the user-specific configuration settings. In some embodiments, at the step 330, the data from distinct blocks may be removed in a predefined or adaptively determined sequence. A data path connection between the host computer 130 and the mobile DSD 100 for period of time may be required to complete the user data removal process 330.

In some embodiments, the process of restoring the mobile DSD 100 to factory settings may further include, at step 340, the restoring to factory settings module 220 processing one or more machine-readable instructions received from the host computer 130 via the data path 104 and the external port 105 to implement steps 320 and 330.

Deriving the Unique Access Passcode

Figure 4A:
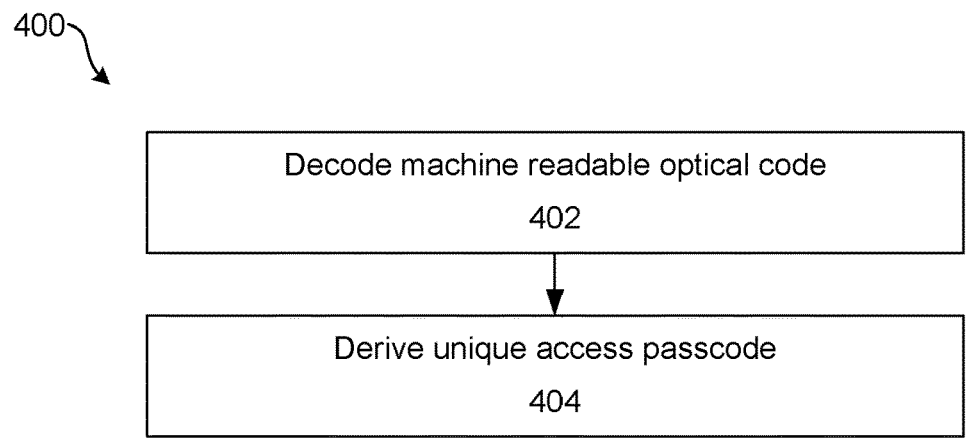
FIG. 4a illustrates a flow diagram of a process for directly deriving the unique access passcode from the machine readable optical code according to one embodiment.
Figure 4B:
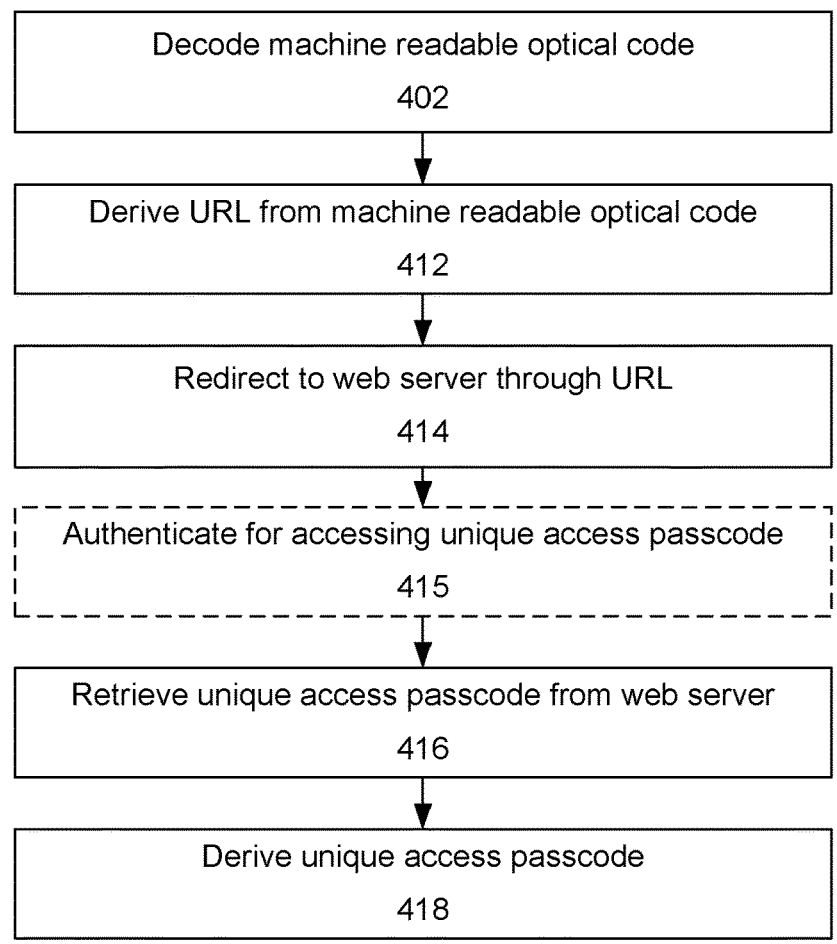
FIG. 4b illustrates a flow diagram of a process for deriving the unique access passcode from the machine readable optical code based on a web server according to one embodiment.

FIGS. 4a and 4b illustrate a process 400 performed by the host computer 130 or user device 131 for deriving the UAP by decoding the machine readable optical code 118 of the housing 120, as depicted in FIGS. 1a and 1c.

Figure 5:
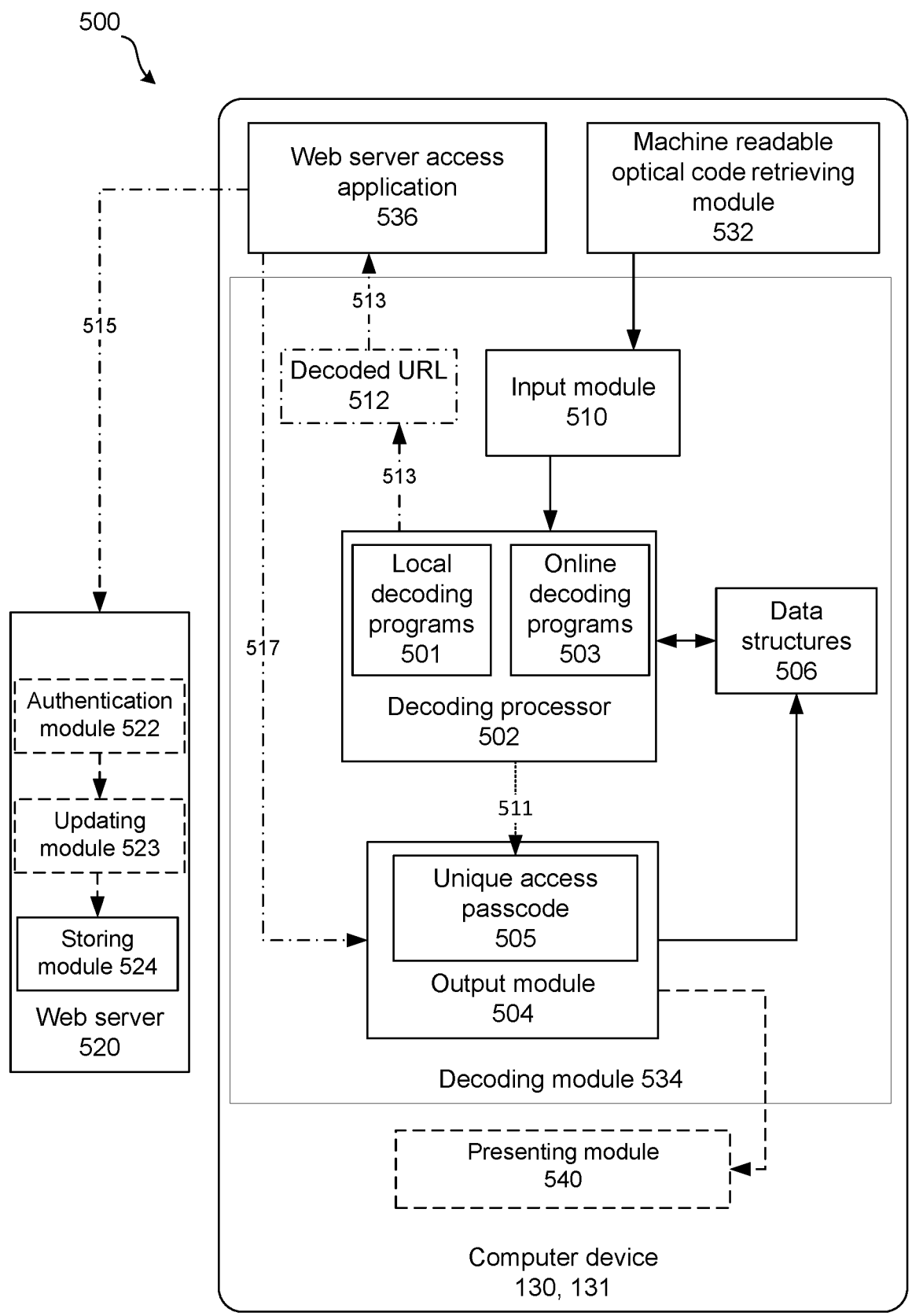
FIG. 5 is a block diagram of an exemplary configuration of a host computer to derive the unique access passcode from the machine readable optical code.

FIG. 5 illustrates a block diagram representation of an exemplary configuration of the components configured in the host computer 130 or user device 131, including a machine readable optical code retrieving module 532, a decoding module 534 and a presenting module 540, to implement the UAP derivation process 400.

Referring back to FIGS. 4a and 4b, at step 402, the machine readable optical code 118 is decoded by the decoding module 534 of the host computer 130 or user device 131. Step 402 is based on capturing and retrieving a scan for machine readable optical code 118 performed by a machine readable optical code retrieving module 532. In some embodiments, the machine readable optical code retrieving module 532 may include one or more image capturing components, such as one or more cameras, sensors, image processors, display devices for displaying the captured image and an assigned memory unit for storing the scan. The machine readable optical code retrieving module 532 may be configured to scan the machine readable optical code irrespective of its visible or invisible state (i.e., from its visual perceptibility by a human observer). The machine readable optical code retrieving module 532 may further be configured to transmit the scan to a decoding module 534, for example, through an input module 510.

In the described embodiments, the decoding step 402 is further based on decoding the machine readable optical code 118 performed by the decoding module 534. The decoding processor 502 is configured to: extract the access passcode data by reading the machine readable optical code; and process the access passcode data to determine the unique access passcode. The decoding processor 502 receives scan data representing a scan of the machine readable optical code 118 from the input module 510, and generates information in relation to the UAP, in the form of the access passcode data.

In some embodiments, the decoding processor 502 may implement one or more local decoding programs 501 stored in a data structures module 506 or one or more online decoding programs 503. For example, in some cases, the decoding processor 502 may determine that the local programs 501 do not contain suitable decoding methods for a specific type of machine readable optical code 118 (as described in FIG. 1c and relevant descriptions). In response to this, the decoding processor 502 may further access available online programs 503 for decoding the specific type of machine readable optical code 118.

In some embodiments, the local decoding programs 501 stored in a data structures module 506 may be updated by installing one or more new decoding programs (e.g., decoding software). Accordingly, the decoding processor 502 will be able to implement the one or more new decoding programs.

Referring back to FIG. 4a, the UAP is directly derived from the machine readable optical code at step 404. In such examples, the access passcode data represents the UAP as encoded directly in the form of the machine readable optical code 118. For example, a QR code can store maximum 3 kb data, i.e., maximum 7,089 numeric characters or 4,269 alphanumeric characters. In such implementations, the decoding processor 502 may directly derive access passcode data representing the UAP 505 at step 404 and send the UAP 505 to the output module 504 via a data stream 511.

In some embodiments, the representation of the UAP encoded within the access passcode data is a secure representation of the UAP. A secure representation may include a secured value of the UAP obtained by applying an encoding function or an encryption function to the UAP value, and generating a corresponding QR code or other machine readable optical code 118 to represent the encoded or encrypted value. In some embodiments, the access passcode data is configured to represent a secure UAP value generated using a symmetric-key encryption algorithm, such as the Advanced Encryption Standard (AES) algorithm with a 256-bit encryption key. The encryption key is uniquely generated by the manufacturer of the mobile DSD 100, and is made accessible only to computer devices 130, 131 that are authorized to perform a RTFS operation on the mobile DSD 100.

In such embodiments, processing the access passcode data includes applying a decoding or decryption function to the secure UAP representation (i.e., the secure UAP value obtained from reading and decoding the QR code 118). In some examples, the host computer 130 executes a "Secure RTFS" software application configured to apply a decryption function to obtain the true UAP from the secure UAP representation of the access passcode data. For example, the Secure RTFS application may be configured to process the access passcode data to determine the secure UAP representation (e.g., a cipher text value of the encrypted UAP), retrieve the appropriate encryption key to decrypt the cipher text value (i.e., in response to input from an authorized user or otherwise), and perform an appropriate decryption function (e.g., 256-bit AES) to obtain the UAP. The encoding of secured UAP representations within the machine readable optical code 118 is advantageous in enabling a form of two-factor authentication, thereby preventing unauthorized parties from performing a RTFS operation on the mobile DSD 100 even if the unauthorized party gains physical access to the device 100.

FIG. 4b illustrates a process where the access passcode data encoded in the machine readable optical code 118 includes a uniform resource locator (URL) directing to a web server. In some embodiments, at step 412, the access passcode data includes the URL in place of a representation of the UAP, such that no UAP is directly obtainable without execution of the URL (c.f., deriving the UAP from decoding a representation of the code 118 at step 402). At step 414, the host computer 130 or user device 131 is redirected to an external web server through the URL derived at step 412.

With reference to FIG. 5, the decoding module 534 can derive a decoded URL 512 (e.g., by the decoding processor 502) at step 412 with a process similar to the decoding step 404 that directly decodes the UAP, as described earlier. In some embodiments, the decoding processor 502 further sends the decoded URL 512 to a web server access application 536 (e.g., a web browser) configured to access a web server 520 to which the URL 512 directs via a data flow 513. The web server access application 536 then accesses the webserver 520 via a data stream 515.

In the described embodiments, the web server 520 is configured to provide the UAP to the host computer 130 or user device 131. The use of the web server 520 is advantageous in enabling a larger amount of access passcode data to be stored and maintained in association with the mobile DSD 100, as compared to a direct encoding of the access passcode data within the machine readable optical code 118. The web server 520 may include a storing module 524 configured to store at least the UAP 505. Furthermore, the web server 520 may be configured to implement particular data maintenance and access policies, and/or protocols, to maintain, update, and/or secure access to the access passcode data in response to a direction of the host computer 130 or user device 131 to the web server 520, or otherwise generally.

In some embodiments, the web server is remotely controlled by manufacturers, vendors, or any other authorized parties. For example, the UAP 505 stored on the web server 520 can be updated (e.g., changed or removed) by an updating module 523 controlled by the manufacturers or any other authorized party. An another example, the UAP 505 may be removed from the storing module 524 post the production of the mobile DSD 100, in response to detecting a risk that unauthenticated third parties may have access to the UAP 505 and may perform restoring the mobile DSD to factory settings for unauthorized purpose (e.g., refurbishing and resale). In some embodiments, the web server 520 may enforce a security policy requiring a host device to authenticate or complete an authorization activity to enable the provision of the UAP to the host device.

Referring back to FIG. 4b, in some embodiments, web server 520 may require the host computer 130 or user device 131 to authenticate or complete an authorization activity before providing the UAP to the host computer 130 or user device 131. The authentication processes verify the identity of the host computer 130 as an authorized user to access the UAP stored on the web server 520. Conducting the one or more authorization processes may be advantageous to promote the authenticity and confidentiality of the host computer 130 or user device 131 and establish a secure channel between the web server 520 and the host computer 130 or user device 131.

With reference to FIG. 5, in some embodiments, the authentication step 415 is performed by an authentication module 522 configured in the web server 520. In some embodiments, the one or more authentication processes may include any one or more of (i) a basic password-based authentication process (e.g., to log in with a pre-registered account and password/PIN); (ii) a multi-factor factor authentication (MFA) process that requires two or more independent ways to identify the host computer 130 or user device 131 where the combined passcode enabling access to the user access passcode 512 may remain secure even in the case that one passcode is compromised; (iii) a certificate-based authentication process using digital certificates including the digital identity of the host computer 130 or user device 131 and the digital signature of a certification authority; and (iv) a token-based authentication process that enables the host computer 130 or user device 131 to input the credentials once and receive a unique encrypted string of random characters in exchange.

Referring to FIG. 4b, at steps 416 and 418, the host computer 130 or user device 131 retrieves the UAP 505 from the web server 520 and derives the UAP 505 at the decoding module 534, respectively. In some embodiments, step 418 may include the web server access application 536 sending the UAP 505 retrieved from the web server 520 to the output module 504 via a data stream 517. Further, at step 418, the output module receives and saves the UAP 505.

In some embodiments, the presenting module 540 on the host computer 130 or user device 131 may receive the UAP 505 from the output module 534 and present the UAP 505 to a user of the device. For example, the presenting module 540 may include any one or more of a screen to virtually present the UAP 505, a speaker to vocally present the UAP 505 and a printer to generate a physical print of the UAP 505.

Restoring Mobile DSD to Factory Settings by Host Computer System

Figure 6:
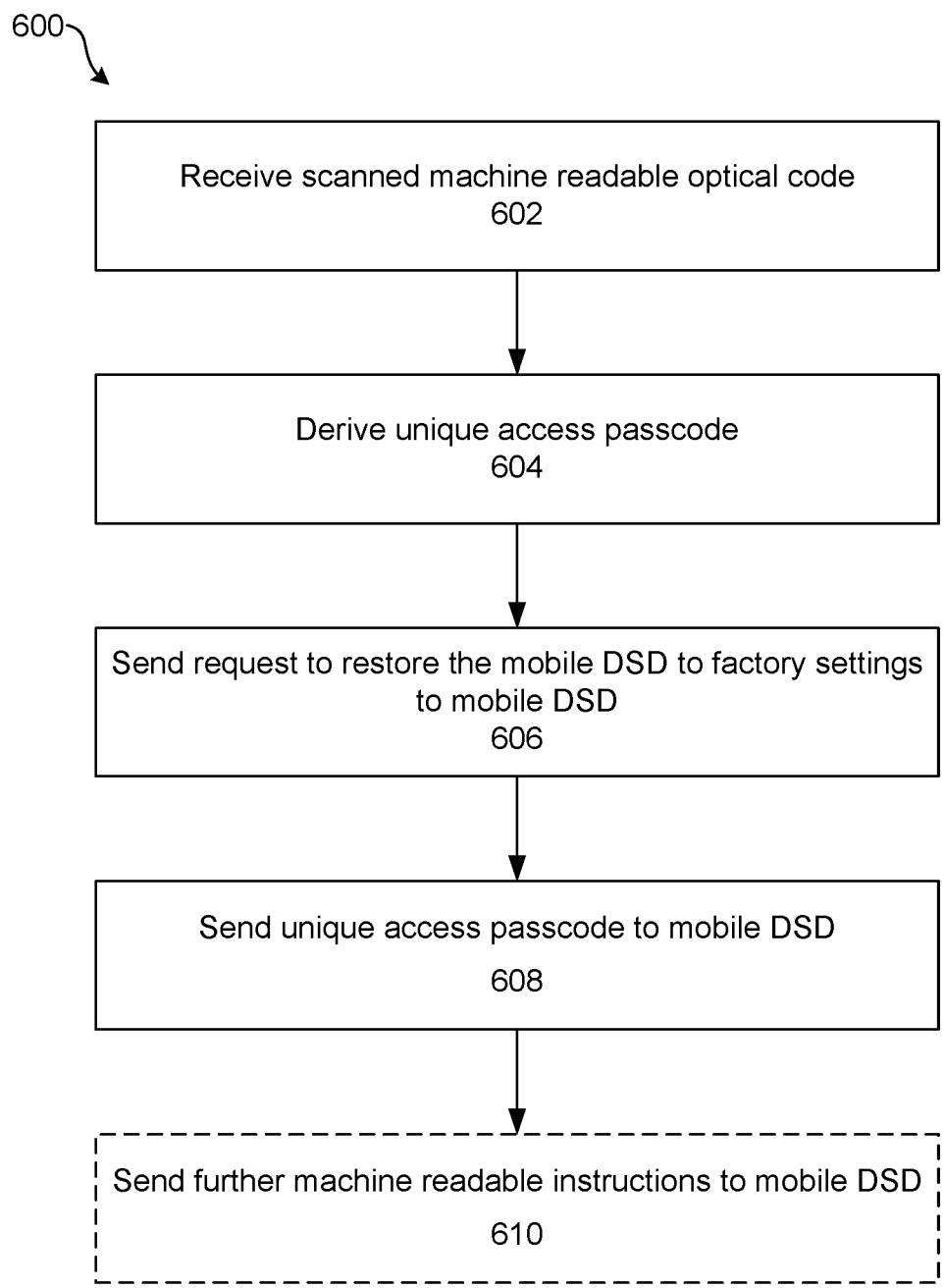
FIG. 6 illustrates a flow diagram of a process performed by the host computer for restoring the mobile DSD to factory settings according to one embodiment.

FIG. 6 illustrates a process performed by the host computer 130 for restoring the mobile DSD 100 to factory settings. At steps 602 and 604, the host computer 130 or user device 131 receives a scan of the visible machine readable optical code 118 and derives the UAP 505 from the received scan, respectively.

Step 602 may be performed by the machine readable optical code retrieving module 532 of the host computer 130 or user device 131, and step 604 may be performed by the decoding module 534 (as shown in FIGS. 1a and 5). In some embodiments, the user device 131 may perform step 602, or alternatively, both steps 602 and 604. In such implementations, the user device 131 may transmit the scan of the machine readable optical code 118 or the UAP 505 to the host computer 130 via the data stream 125 to enable the host computer 130 to send further instructions to the mobile DSD 100.

At steps 606 and 608, the host computer 130 sends the request to restore the mobile DSD to factory settings and the UAP 505 to the controller 110 via the data path 104 and the external port 105 (as shown in FIGS. 1, 3 and 5). In some embodiments, the host computer 130 may further send one or more further machine readable instructions to the controller 110 at step 610 when performing restoring the mobile DSD to factory settings.

In some embodiments, specialized software may be installed on the host computer 130 for sending the one or more machine-readable instructions to the mobile DSD 100. The specialized software may further be configured to monitor and present information in relation to restoring the mobile DSD 100 to factory settings on a user interface.

In some embodiments, the specialized software may provide the user of host computer 130 with options in relation to restoring the mobile DSD 100 to factory settings on the user interface. The specialized software may further convert instructions received from the user to one or more machine-readable instructions that can be recognized and executed by the connected mobile DSD 100 (e.g., SCSI and UFS commands).

In some embodiments, the specialized software may monitor the status of the connection between the host computer 130 and the mobile DSD 100 and deliver the information to the user of the host computer 130 (e.g., "the connection is successful, failed or unstable").

In some embodiments, the user interface of the specialized software may display current restoring progress (e.g., x % completed) and results (e.g., restoring to factory settings failed or completed).

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A mobile data storage device (DSD) comprising:
a non-volatile storage medium configured to store user data;
a data path configured to transmit data between the mobile DSD and a host computer system;
a housing covering the non-volatile storage medium and having a machine readable optical code visible on an external surface of the housing;
a non-volatile system memory configured to store an internal security passcode; and
a controller disposed within the housing and configured to:
receive, from the data path, a request to restore the mobile DSD to factory settings;
receive, from the data path, a unique access passcode derived by:
reading, by a computing device that does not include the mobile DSD, the machine readable optical code from the housing;
determining, responsive to reading the machine readable optical code, the unique access passcode; and
sending, by the host computer system, the unique access passcode to the mobile DSD;
validate, based on the internal security passcode, the unique access passcode; and
in response to determining that the unique access passcode is valid, restore the mobile DSD to factory settings.

2. The mobile data storage device of claim 1, wherein the controller validates the unique access passcode by:
generating a cryptographic access passcode by applying one or more cryptographic functions to the unique access passcode;
comparing the cryptographic access passcode with the internal security passcode; and
in response to determining that the cryptographic access passcode matches the internal security passcode, determining that the unique access passcode is valid.

3. The mobile data storage device of claim 1, wherein the machine readable optical code encodes access passcode data related to the unique access passcode.

4. The mobile data storage device of claim 3, wherein the computing device is configured to:
extract the access passcode data by reading the machine readable optical code; and
process the access passcode data to determine the unique access passcode.

5. The mobile data storage device of claim 4, wherein the extracted access passcode data includes a representation of the unique access passcode.

6. The mobile data storage device of claim 5, wherein:
the representation of the unique access passcode is a secure representation of the unique access passcode; and
processing the access passcode data includes applying a decoding or decryption function to the secure representation of the unique access passcode.

7. The mobile data storage device of claim 4, wherein:
the access passcode data includes a uniform resource locator (URL) directing to a web server; and
processing the access passcode data causes the web server to provide the unique access passcode to the computing device.

8. The mobile data storage device of claim 7, wherein providing the unique access passcode to the computing device by the web server is in response to completion of one or more user authentication processes.

9. The mobile data storage device of claim 4, wherein the computing device is further configured to transmit the determined unique access passcode to the host computer system.

10. The mobile data storage device of claim 4, wherein the computing device is a computing device of the host computer system.

11. The mobile data storage device of claim 1, wherein the restoring the mobile DSD to factory settings comprises:
disabling one or more security functionalities configured in the mobile DSD; and
removing all the user data from the non-volatile storage medium.

12. The mobile data storage device of claim 1, wherein the mobile DSD is configured to connect to the host computer system via a data connector of the mobile DSD that is configured to be in connection with the data path.

13. A method for restoring a mobile data storage device (DSD) to factory settings, the method executed by a controller of the mobile data storage device and comprising:

receiving, from a host computer system connected to a data path of the mobile DSD, a request to restore the mobile DSD to factory settings;

receiving, from the host computer system, a unique access passcode derived by:

reading, by a computing device that does not include the mobile DSD, a machine readable optical code from an external surface of a housing covering a non-volatile storage medium of the mobile DSD;

determining, responsive to reading the machine readable optical code, the unique access passcode; and sending, by the host computer system, the unique access passcode to the mobile DSD:

validating, based on an internal security passcode stored in a non-volatile system memory of the mobile DSD, the unique access passcode;

determining that the unique access passcode is valid; and in response to determining that the unique access passcode is valid, restoring the mobile DSD to factory settings.

14. The method of claim 13, wherein:

validating the unique access passcode comprises:

generating a cryptographic access passcode by applying one or more cryptographic functions to the unique access passcode; and comparing the cryptographic access passcode with the internal security passcode; and determining that the unique access passcode is valid comprises determining that the cryptographic access passcode matches the internal security passcode.

15. The method of claim 13, further comprising:

extracting, by the computing device, access passcode data from an optical scan representation obtained by reading the machine readable optical code; and processing, by the computing device, the access passcode data to determine the unique access passcode.

16. The method of claim 15, wherein:

the extracted access passcode data includes one of:

the unique access passcode; and a secure representation of the unique access passcode; and processing the access passcode data includes applying a decoding or decryption function to the secure representation of the unique access passcode.

17. The method of claim 15, wherein:

the access passcode data includes a uniform resource locator (URL) directing to a web server; and processing the access passcode data causes the web server to provide the unique access passcode to the host computer system.

18. The method of claim 17, wherein providing the unique access passcode by the web server is in response to completion of one or more user authentication processes.

19. The method of claim 13, wherein the restoring the mobile DSD to factory settings comprises:

disabling one or more security functionalities configured in the mobile DSD; and removing all user data from the non-volatile storage medium.

20. A data storage device (DSD) comprising:

a non-volatile storage medium configured to store user data;

means for transmitting data between a host computer system and the data storage device;

a housing covering the non-volatile storage medium and having a machine readable optical code visible on an external surface of the housing;

means for storing an internal security passcode;

means for receiving, from the means for transmitting data between the host computer system and the data storage device, a request to restore the DSD to factory settings;

means for receiving, from the means for transmitting data between the host computer system and the data storage device, a unique access passcode derived by:

reading, by a computing device that does not include the DSD, the machine readable optical code from the housing;

determining, responsive to reading the machine readable optical code, the unique access passcode; and sending, by the host computer system, the unique access passcode to the DSD;

means for validating, based on the internal security passcode, the unique access passcode; and means for restoring, in response to determining that the unique access passcode is valid, the DSD to factory settings.

* * * * *